United States Patent
Epstein et al.

(10) Patent No.: US 10,732,344 B2
(45) Date of Patent: Aug. 4, 2020

(54) COLLIMATING LIGHT GUIDE

(71) Applicant: 3M INNOVATIVE PROPERTIES COMPANY, St. Paul, MN (US)

(72) Inventors: Kenneth A. Epstein, St. Paul, MN (US); John A. Wheatley, Lake Elmo, MN (US); Tao Liu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 185 days.

(21) Appl. No.: 15/755,172

(22) PCT Filed: Aug. 24, 2016

(86) PCT No.: PCT/US2016/048343
§ 371 (c)(1),
(2) Date: Feb. 26, 2018

(87) PCT Pub. No.: WO2017/035206
PCT Pub. Date: Mar. 2, 2017

(65) Prior Publication Data
US 2018/0267228 A1  Sep. 20, 2018

Related U.S. Application Data

(60) Provisional application No. 62/210,202, filed on Aug. 26, 2015.

(51) Int. Cl.
*G02B 6/00* (2006.01)
*F21V 8/00* (2006.01)

(52) U.S. Cl.
CPC ......... *G02B 6/0061* (2013.01); *G02B 6/0036* (2013.01); *G02B 6/0038* (2013.01); *G02B 6/0053* (2013.01); *G02B 6/0078* (2013.01)

(58) Field of Classification Search
None
See application file for complete search history.

(56) References Cited

U.S. PATENT DOCUMENTS 5,359,691 A   10/1994   Tai
5,396,350 A    3/1995   Beeson
(Continued)

FOREIGN PATENT DOCUMENTS

KR   10-2014-0145105   12/2014
WO   WO 2017-035298    3/2017

OTHER PUBLICATIONS

International Search Report for PCT International Application No. PCT/US2016/048343, dated Oct. 31, 2016, 5 pages.

*Primary Examiner* — Michael Stahl
(74) *Attorney, Agent, or Firm* — Lisa P. Fulton

(57) ABSTRACT

A light guide includes a light input surface, a first major surface orthogonal to the light input surface, a second major surface opposing the first major, a plurality of discrete light extraction features disposed on the second major surface and a plurality of closely packed prisms disposed along the second major surface. The plurality of discrete light extraction features separate the plurality of closely packed prisms from the second major surface. Each of the closely packed prisms include a first prism surface forming a first angle with the second surface in a range from 80 to 100 degrees or in a range from 85 to 95 degrees or in a range from 87 to 93 degrees.

26 Claims, 8 Drawing Sheets

(56) References Cited

U.S. PATENT DOCUMENTS

| | | | | |
|---|---|---|---|---|
| 5,914,760 A * | 6/1999 | Daiku | ............... | G02B 3/005 |
| | | | | 349/65 |
| 8,434,913 B2 | 5/2013 | Vissenberg | | |
| 8,441,602 B2 | 5/2013 | Kim | | |
| 8,807,816 B2 | 8/2014 | Desmet | | |
| 8,956,035 B2 | 2/2015 | Pan | | |
| 2002/0163790 A1 | 11/2002 | Yamashita | | |
| 2004/0022050 A1 * | 2/2004 | Yamashita | ........... | G02B 6/0021 |
| | | | | 362/615 |
| 2005/0157518 A1 * | 7/2005 | Kazuhiro | ............. | G02B 6/0038 |
| | | | | 362/615 |
| 2006/0214905 A1 * | 9/2006 | Okazaki | ............ | G09G 3/3406 |
| | | | | 345/102 |
| 2008/0239749 A1 * | 10/2008 | Saccomanno | ........ | G02B 6/0028 |
| | | | | 362/609 |
| 2010/0053502 A1 * | 3/2010 | Kim | .................... | G02B 6/0053 |
| | | | | 349/64 |
| 2011/0051460 A1 * | 3/2011 | Montgomery | ....... | G02B 6/0038 |
| | | | | 362/620 |
| 2011/0299013 A1 | 12/2011 | Ishida | | |
| 2012/0140436 A1 | 6/2012 | Yang | | |
| 2013/0286653 A1 | 10/2013 | Holman | | |
| 2014/0211508 A1 | 7/2014 | Yuan | | |
| 2014/0268872 A1 | 9/2014 | Holman | | |
| 2015/0092390 A1 * | 4/2015 | Birman | ................ | G02B 6/002 |
| | | | | 362/23.14 |

* cited by examiner

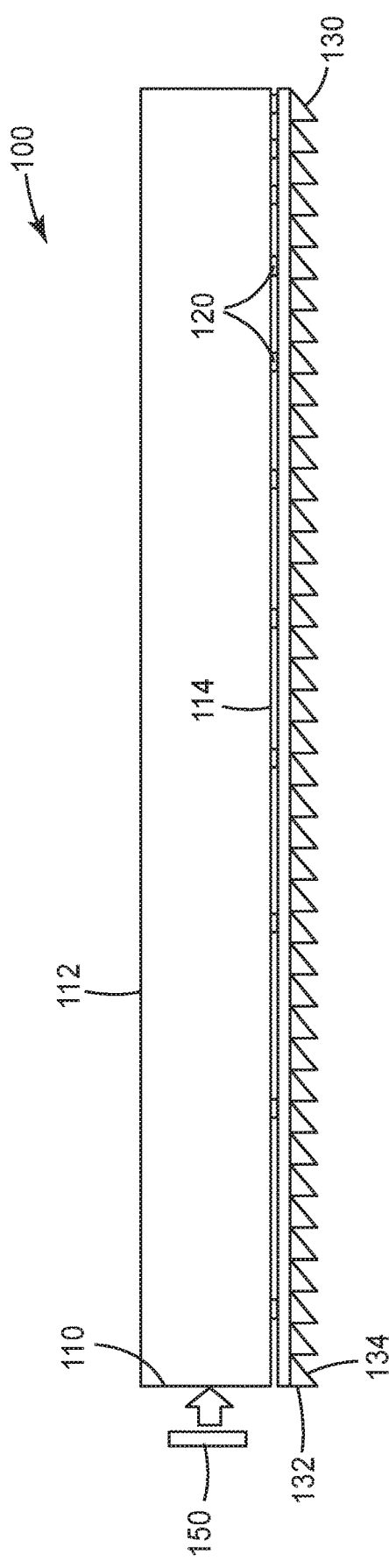
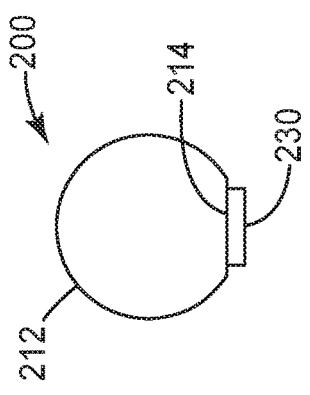

COLLIMATING LIGHT GUIDE

BACKGROUND

Spot luminaires are typically powered by a light emitting diode (LED) or an assembly of LEDs and concentrated into a collimated beam with a low cost spun aluminum reflector. Spot luminaires provide bright low-glare lighting; however, the reflector profile becomes deeper and less efficient as the focused beam narrows.

There is interest in adapting LCD backlight technology to illumination. A slab light guide is reasonably efficient in the backlight of an edgelit TV. However, these backlights are designed for wide view displays, and they emit at high angles unsuited to low-glare specifications. A lenticular light guide is a collimated source, but the functional luminaire requires a turning film and a specular reflector in addition to the light guide.

SUMMARY

The present disclosure relates to a collimating light guide. In particular this light guide can provide uniform light extraction and peak axial intensity.

In one aspect, a light guide includes a light input surface, a first major surface orthogonal to the light input surface, a second major surface opposing the first major, a plurality of discrete light extraction features disposed on the second major surface and a plurality of closely packed prisms disposed along the second major surface. The plurality of discrete light extraction features separate the plurality of closely packed prisms from the second major surface. Each of the closely packed prisms include a first prism surface forming a first angle with the second surface in a range from 80 to 100 degrees or in a range from 85 to 95 degrees or in a range from 87 to 93 degrees.

In a further aspect, a light guide includes a light input surface, a first major surface orthogonal to the light input surface, a second major surface opposing the first major, a plurality of light extraction features disposed on the second major surface, and a plurality of closely packed prisms disposed along the second major surface where the plurality of light extraction features separate the plurality of closely packed prisms from the second major surface. Each of the closely packed prisms have a first prism surface closer to the light input surface than a second prism surface and the first prism surface forms a first angle with the second major surface. The first angle is in a range from 80 to 100 degrees or in a range from 85 to 95 degrees or in a range from 87 to 93 degrees. The light input surface forms an inner radius of the at least a portion of a circle and the plurality of closely packed prisms are concentric with the inner radius.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which:

FIG. 1 is a cross-sectional schematic diagram of an illustrative collimating light guide;

FIG. 3 is a cross-sectional schematic diagram of an illustrative collimating elongated rod light guide;

DETAILED DESCRIPTION

Figure 2:
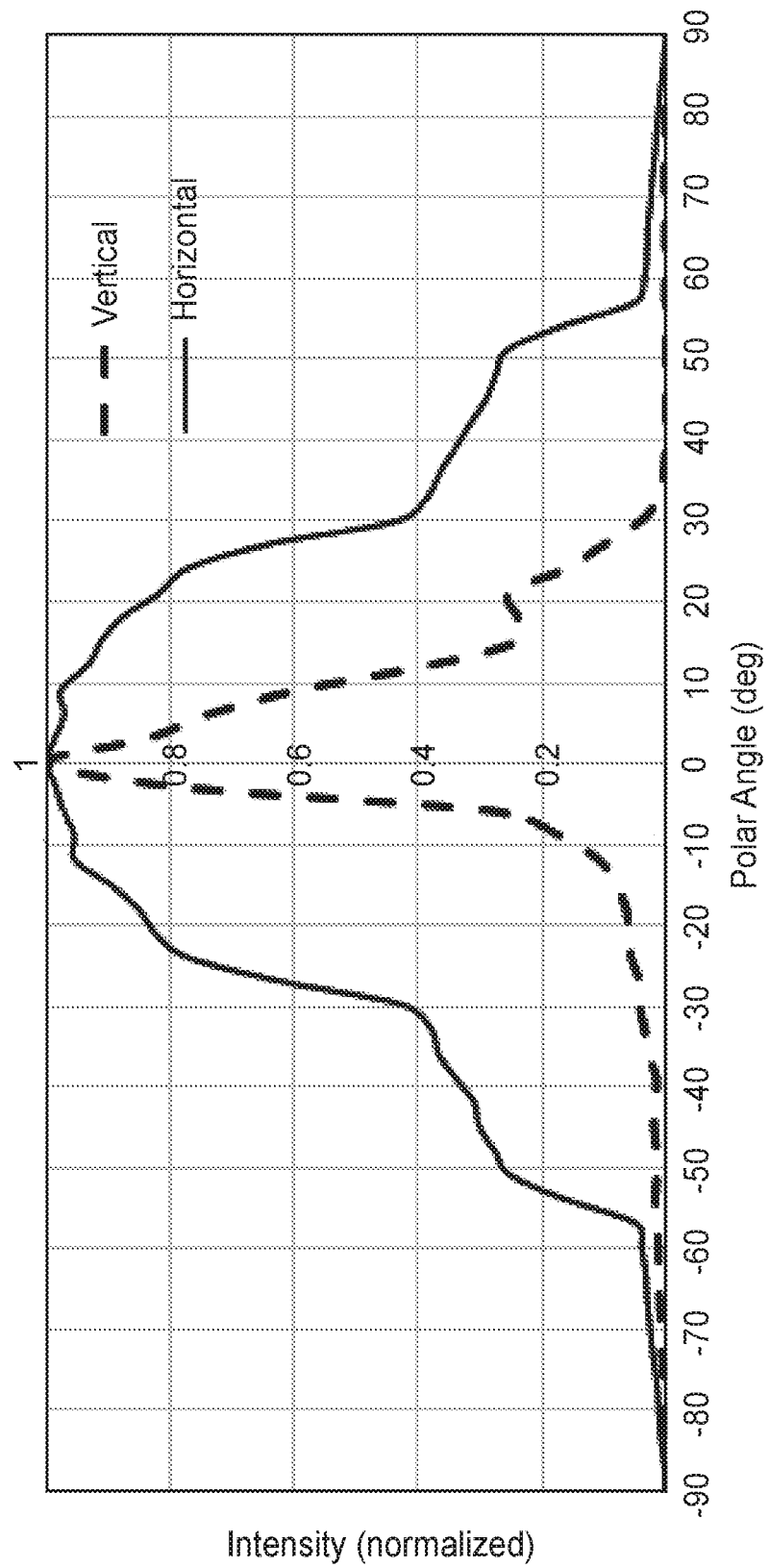
FIG. 2 is a polar angle intensity graph for Example 1.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties desired by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The present disclosure relates to a collimating light guide. In particular this light guide can provide uniform light extraction and peak axial intensity. A light extraction surface includes a plurality of discrete light extraction features separating a plurality of closely packed prisms from a major surface of the light guide. The prisms are approximately right angle prisms. This collimating light guide can be thin (1 to 10 mm thick for example), efficient (greater than 90% or 95% for example), and provide a narrow beam of emitted light (less than 30 degrees full width half max (FWHM) or less than 20 degrees FWHM, for example). These collimating light guides can utilize Lambertian light (from LEDs for example) and do not require collimated light input, or back reflectors. While the present disclosure is not so limited, an appreciation of various aspects of the disclosure will be gained through a discussion of the examples provided below.

FIG. 1 is a cross-sectional schematic diagram of an illustrative collimating light guide 100. The light guide 100 includes a light input surface 110, a first major surface 112 orthogonal to the light input surface 110 and a second major surface 114 opposing the first major surface 112. A plurality of discrete light extraction features 120 are disposed on the second major surface 114. A plurality of closely packed prisms 130 are disposed along the second major surface 114. The plurality of discrete light extraction features 120 separate the plurality of closely packed prisms 130 from the second major surface 114. Each of the closely packed prisms 130 have a first prism surface 132 closer to the light input surface 110 than a second prism surface 134 and the first prism surface 132 forms a first angle with the second major surface 114. The first angle is in a range from 80 to 100 degrees or in a range from 85 to 95 degrees or in a range from 87 to 93 degrees.

The light guide 100 has a light guide refractive index and the plurality of light extraction features 120 have an extraction feature refractive index and the light guide refractive index. The extraction feature refractive index and the light guide refractive index are within 0.05 or within 0.02 or within 0.01 of each other. The plurality of closely packed prisms 130 can have a refractive index within 0.2 or 0.1 or 0.05 or 0.01 of both or either of the extraction feature refractive index and the light guide refractive index. The light input surface 110 can coincide with the plurality of closely packed prisms 130 and Lambertian light can enter the light input surface 110. In other words, the light guide 100 may not include a collimating region between the light input surface 110 and the first major surface 112 or the second major surface 114. This is useful to simplify the light guide construction and reduce light losses.

A solid state light source such as a light emitting diode 150 (or VCSEL, OLED and the like) can direct Lambertian light into the light input surface 110. The light emitting diode 150 can be adjacent to the light input surface 110. The solid state light source can be separated from the light input surface 110 by an air gap or other low refractive index medium. When two or more solid state light sources are utilized in the light guide construction, each solid state light source can be independently controlled to tailor the light emission out of the light guide. Different colors or spectral output can be tailored by controlling the individual solid state light sources and/or steering element portion directing the emitted light.

In many embodiments the first major surface 112 is parallel with the second major surface 114. These embodiments can be referred to as a "slab" light guide. In other embodiments the first major surface 112 is not parallel with the second major surface 114. In these embodiments the first major surface 112 and the second major surface 114 can form a converging wedge shape. In other embodiments the first major surface 112 and or the second major surface 114 are curved out of plane. In some of these curved embodiments, the light guide forms a "bowl" shaped light guide.

The plurality of discrete light extraction features 120 couple light out of the light guide and depending on the angle of incidence, strike one or more of the closely packed prisms 130 and the light is directed back through and out of the light guide 100 at a near normal angle to the first major surface 112. In some embodiments the discrete light extraction features 120 are randomly placed on the second major surface 114. In other embodiments the discrete light extraction features 120 are uniformly placed on the second major surface 114 resulting in a uniform area density of discrete light extraction features 120 along the second major surface 114. In further embodiments, the area density of the discrete light extraction features 120 increases as a distance away from the light input surface increases.

In many embodiments the plurality of discrete light extraction features 120 reflects or redirects at least 60% or at least 70% or at least 80% or at least 90% or at least 95% or at least 99% of light incident on the plurality of discrete light extraction features 120 out of the first major surface 112. Thus in these embodiments, the light guide 100 does not include a back reflector element proximate to the plurality of discrete light extraction features 120.

The plurality of discrete light extraction features 120 can be formed of any useful material. In some embodiments the plurality of discrete light extraction features 120 are formed of an adhesive such as an optically clear adhesive, for example. In some embodiments the plurality of discrete light extraction features 120 are printed features.

In some embodiments, the first major surface 112 also includes light extraction features and a second plurality of closely packed prisms are disposed along the first major surface 112 and direct light out of the second major surface 114.

Figure 5:
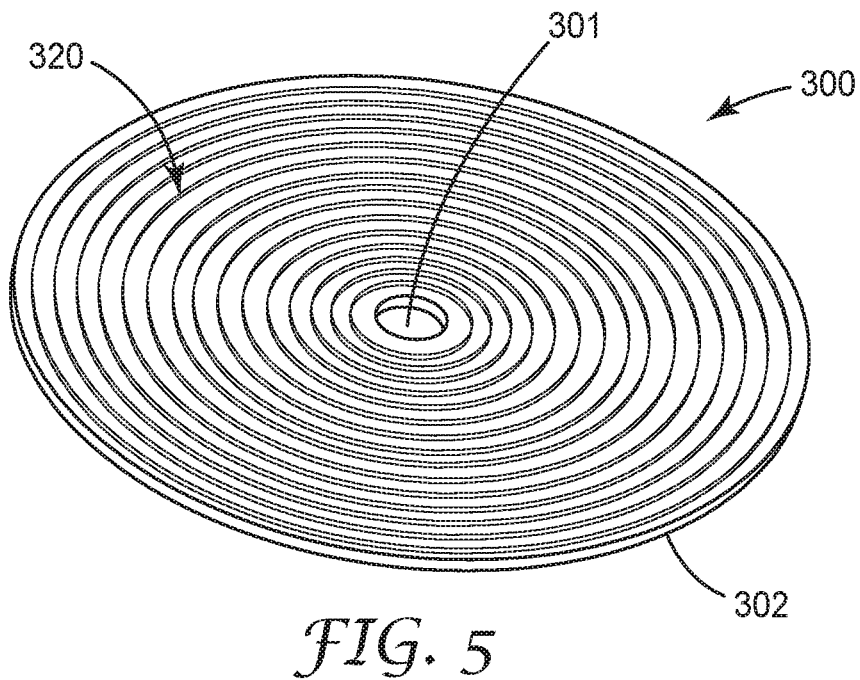
FIG. 5 is a perspective view of an illustrative circular collimating light guide having concentric extraction features.
Figure 6:
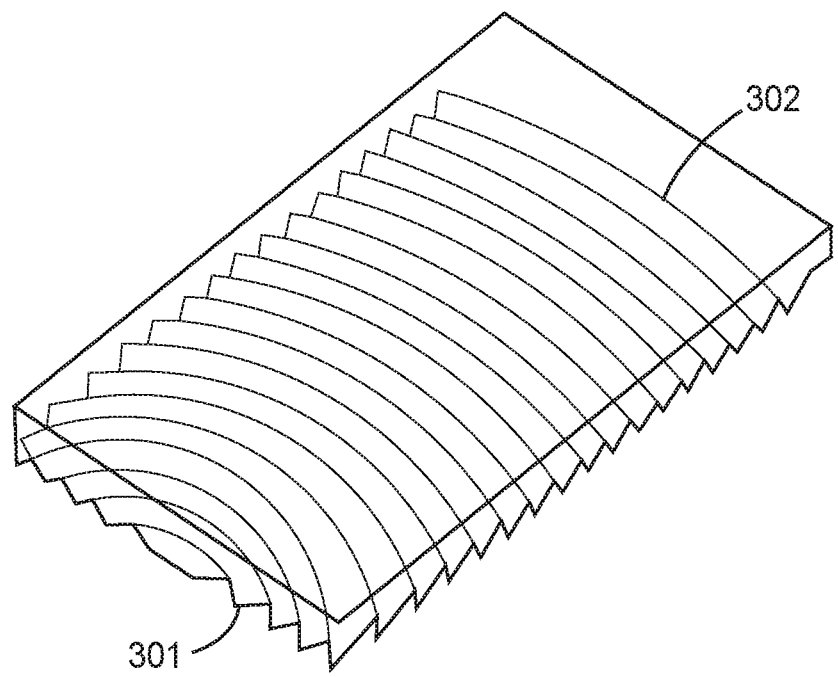
FIG. 6 is a perspective view of a rectangular portion removed from the illustrative circular collimating light guide of FIG. 5.
Figure 8:
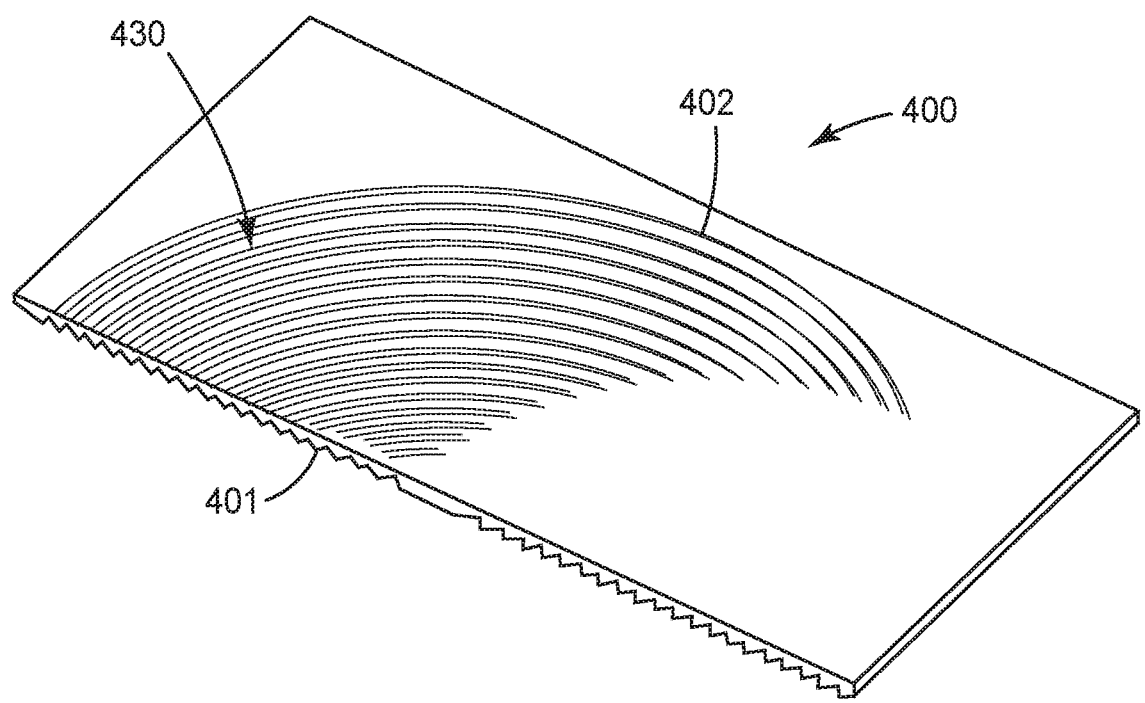
FIG. 8 is a perspective view of an illustrative semi-circular (180 degrees) collimating light guide having concentric extraction features.

FIG. 5 is a perspective view of an illustrative circular collimating light guide 300 having concentric extraction features 320. FIG. 6 is a perspective view of a rectangular portion removed from the illustrative circular collimating light guide 300 of FIG. 5. FIG. 8 is a perspective view of an illustrative semi-circular (180 degrees) collimating light guide 400 having concentric extraction features 430.

These circular or semi-circular light guides having concentric features can be formed by revolving the cross-sectional schematic diagram of an illustrative collimating light guide 100 of FIG. 1 about a center axis. The light guide and light extraction features can form a complete circle (annular solid body) or any portion of a circle for example, 45 degree arc, 90 degree arc, 180 degree arc or 270 degree arc. The light input surface 110 forms an inner radius 301, 401 where one or a plurality of light sources 150 can be placed to direct light into the light input surface 110 or inner radius 301, 401. The closely packed prisms 130, 330, 430 are concentric with each other and the inner radius 301, 401 and an outer radius 302, 402.

In some embodiments the light extraction features can spatially vary along the radius and/or circumference of the circular or semi-circular solid body light guide. In these embodiments emitted light can be selectively tailored according to which light sources are illuminated about the inner radius of the light guide and thus which region light is extracted out of the light guide. For example, a first arc portion of the light guide can direct light in a first direction and a second arc portion of the light guide can direct light in second direction that is different than the first direction. An additional light steering element (described below) can be adjacent to the light emission surface to further tailor the light redirection or modification of light emitted from the light guide or selected portions of the light guide. In some embodiments the doublet light extraction features can be along the second major surface for a first radius distance and then along the first major surface a second radius distance to emit light out of both surfaces of the light guide.

The circular or semi-circular solid body light guide can be disposed on or within a square or rectangular tile element. A plurality of these tile elements can be assembled together to form an array of light guides.

In many embodiments the light guide emits collimated light. For example, light emitted from the light guide has a full width half max (FWHM) of less than 40 degrees or less than 30 degrees or less than 20 degrees.

FIG. 3 is a cross-sectional schematic diagram of an illustrative collimating elongated rod light guide 200. This light guide 200 is similar to the configuration illustrated in FIG. 1 where the light guide 200 has a circular cross-section along the length of the elongated rod light guide 200. The light guide 200 has a circular first major surface 212 (light emission surface) and a planar second major surface 214. A plurality of discrete light extraction features are disposed on the second major surface 214. A plurality of closely packed prisms 230 are disposed along the second major surface 214. The plurality of discrete light extraction features separate the plurality of closely packed prisms 230 from the second major surface 214. Each of the closely packed prisms 230 have a first prism surface closer to the light input surface than a second prism surface and the first prism surface forms a first angle with the second major surface (as illustrated in FIG. 1). The first angle is in a range from 80 to 100 degrees or in a range from 85 to 95 degrees or in a range from 87 to 93 degrees.

Figure 10:
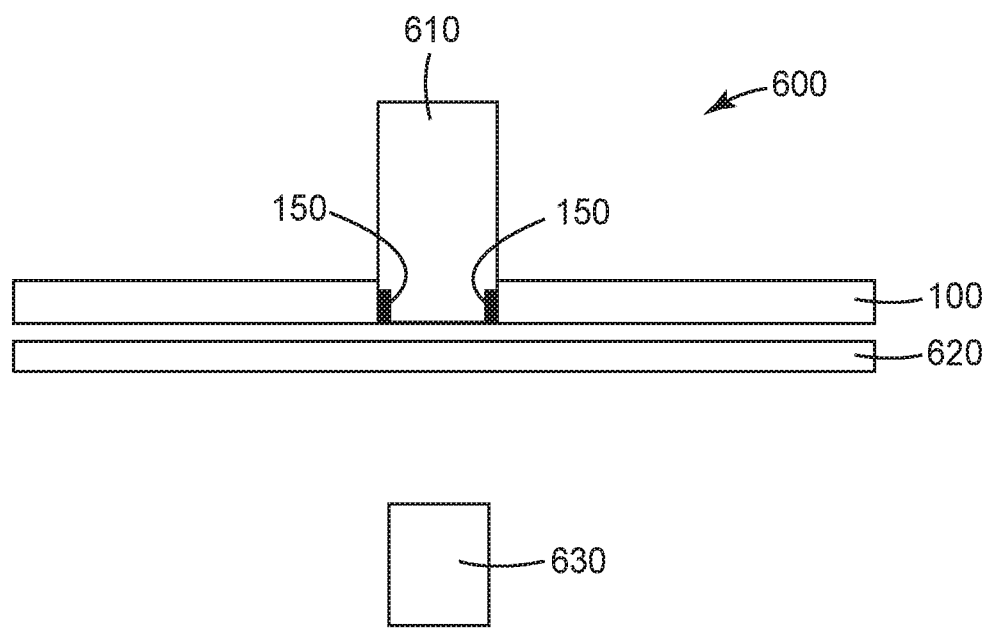
FIG. 10 is a schematic diagram of a luminaire and control system utilizing a light steering element.

FIG. 10 is a schematic diagram of a luminaire and control system 600 utilizing a light steering element 620. The luminaire and control system 600 can include a light guide 100 as described herein and a light steering element 620 adjacent to the light guide 100. A light source 150 heat sink and controller 610 can be fixed to or disposed within an inner radius of the annular light guide 100. As described above, a plurality of light sources 150 such as LEDs can be disposed about the inner radius of the annular light guide 100. Light sources 150 can be selectively illuminated as desired to provide a varied light emission through the light guide 100.

The light steering element 620 can modify the light emitted from the light guide 100. The light steering element 620 can redirect the light emitted from the light guide 100. The light steering element 620 can increase the FWHM in at least one direction of the light emitted from the light guide 100. The light steering element 620 can be spatially variant to steer light in different directions depending on which light sources 150 are illuminated. This can be described as "active light steering". In many embodiments, the light steering element 620 can be fixed relative to the light guide 100. In some embodiments the light steering element 620 can be movable or rotatable relative to the light guide 100.

The controller 610 can be operably connected to a sensor 630. The sensor 630 can sense light emitted from the light guide 100 or light steering element 620 and communication with the controller 610 to modify the light emitted from the light guide 100 or light steering element 620. The sensor 630 can be wired or wirelessly coupled to the controller 610.

Objects and advantages of this disclosure are further illustrated by the following examples, but the particular materials and amounts thereof recited in these examples, as well as other conditions and details, should not be construed to unduly limit this disclosure.

EXAMPLES

Example 1

A rectangular light guide, 100 mm long, 3 mm thick and 10 mm wide with refractive index 1.49, was modeled using LightTools software (from Synopsys Optical Solutions, Pasadena Calif.). The light guide had a linear microprism array (also with index 1.49) on its lower side. The prisms, having base angles of 90 degrees on one side and 44 degrees on the other, were positioned so that they were immediately adjacent to one another with no gap between them as shown in FIG. 1. The height of the prisms was 0.48 mm. Illumination of the light guide was modeled as a Lambertian LED placed at the left side of the light guide facing the 90 degree faces of the prisms.

Optical performance of the light guide was modeled and showed that 99% of the extracted light was directed to the front side of the light guide. The full width at half maximum (FWHM) of the extracted light was +/−28 degrees in the horizontal (i.e., in the plane perpendicular to the light injection direction) and +/−8 degrees in the vertical (in the plane parallel to the light injection) direction. Normalized output intensity in the horizontal and vertical were computed and are shown in FIG. 2.

Example 2

Figure 4:
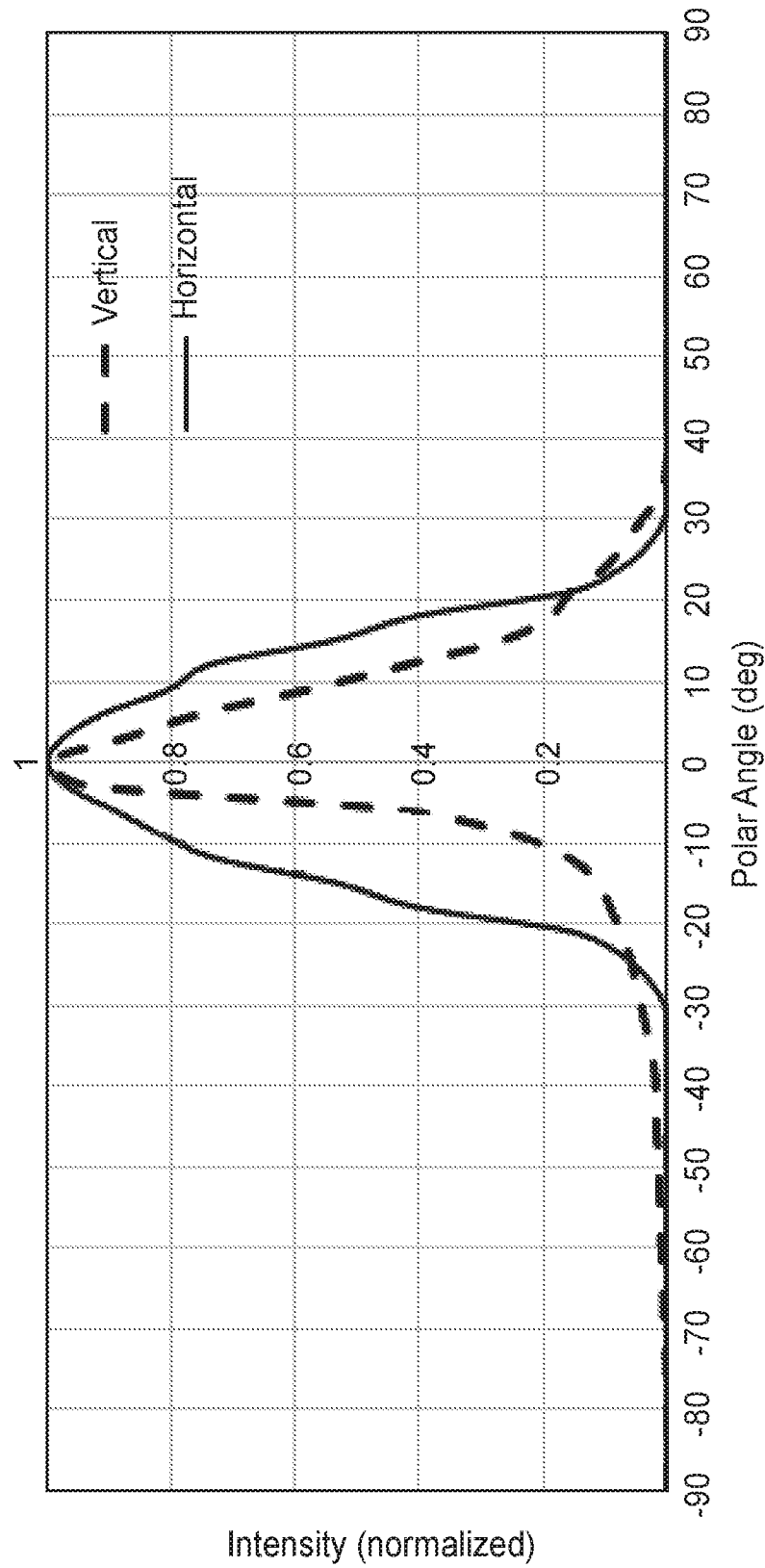
FIG. 4 is a polar angle intensity graph for Example 2.

A light guide with a round cross section, 600 mm in length, 7 mm in diameter and sitting on a 3 mm thick plateau was modeled again using LightTools software. A prism array with the same geometry as in Example 1 ran down the length of the bottom light guide as in FIG. 1. A cross section of the light guide is shown in FIG. 3. The refractive index of both light guide and prisms was 1.49. The light guide was illuminated from the left (the side facing the 90 degree faces of the prisms). Optical performance was again computed by the model and showed that 98% of the extracted light was directed to the front side of the light guide. Full width at half maximum (FWHM) was +/−16 degrees in the horizontal and +/−8 degrees along the vertical. Normalized output intensity in the horizontal and the vertical were computed and are shown in FIG. 4.

Example 3

Figure 7:
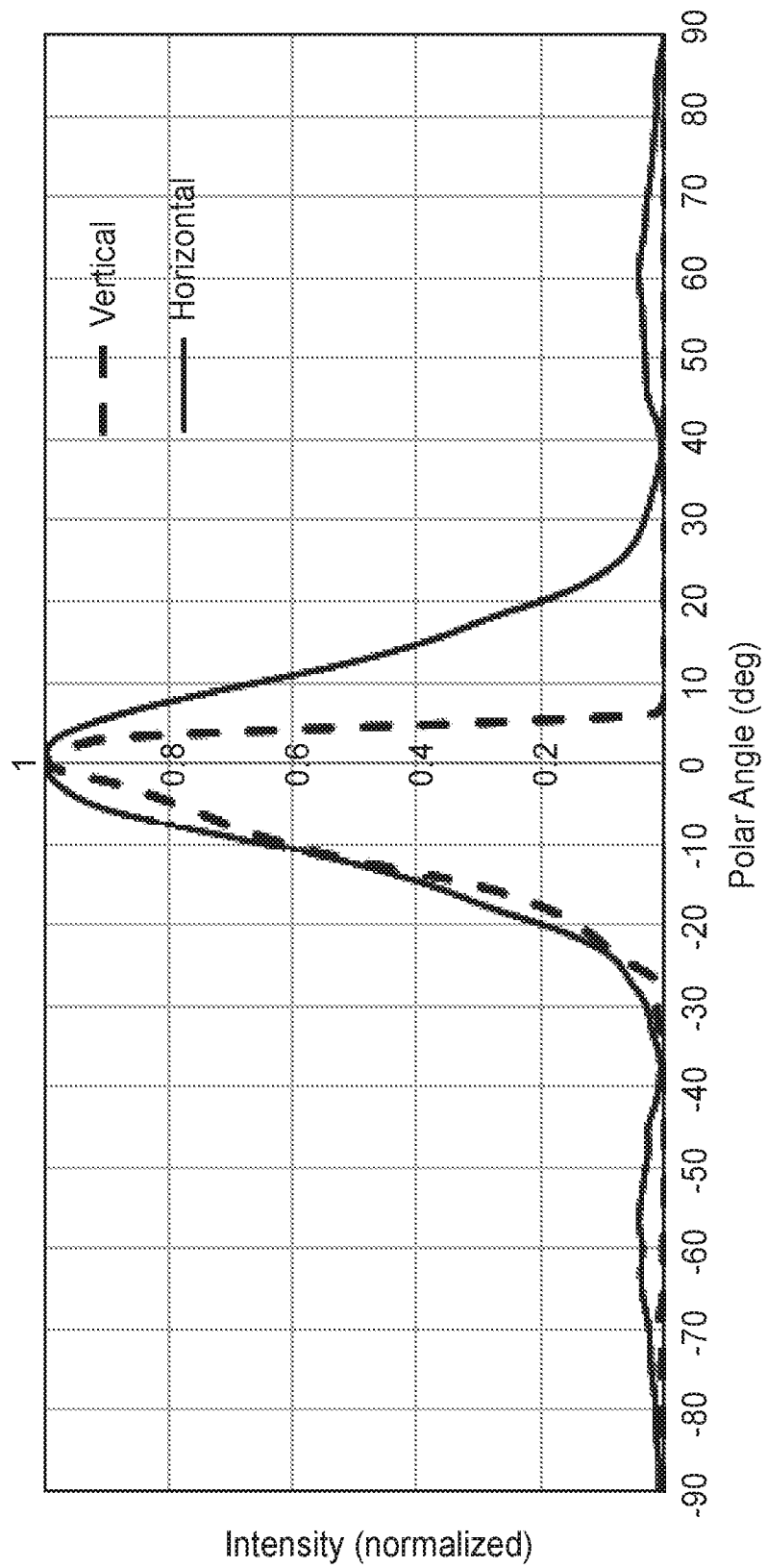
FIG. 7 is a polar angle intensity graph for Example 3.

A model of a circular light guide was made by revolving the prisms shown in the linear light guide of FIG. 1 in a plane around the center of the light guide. The result is shown in FIG. 5. Then the model was modified by trimming the disk to form a rectangular light guide of dimensions 10 mm by 6 mm with a thickness of 0.6 mm. The trimmed light guide is shown in FIG. 6. The light guide with prisms had a refractive index of 1.49. Illumination of the light guide was modeled as a Lambertian LED (2 mm by 0.5 mm) placed at the left end of the light guide near the center of the circular arc of prisms. Optical performance of the light guide was modeled; it showed that the full width of half maximum (FWHM) was +/−12.6 degrees in the horizontal and +12/−4.4 degrees in the vertical direction. Normalized output intensity in the horizontal and the vertical were computed and are shown in FIG. 7.

Example 4

Figure 9:
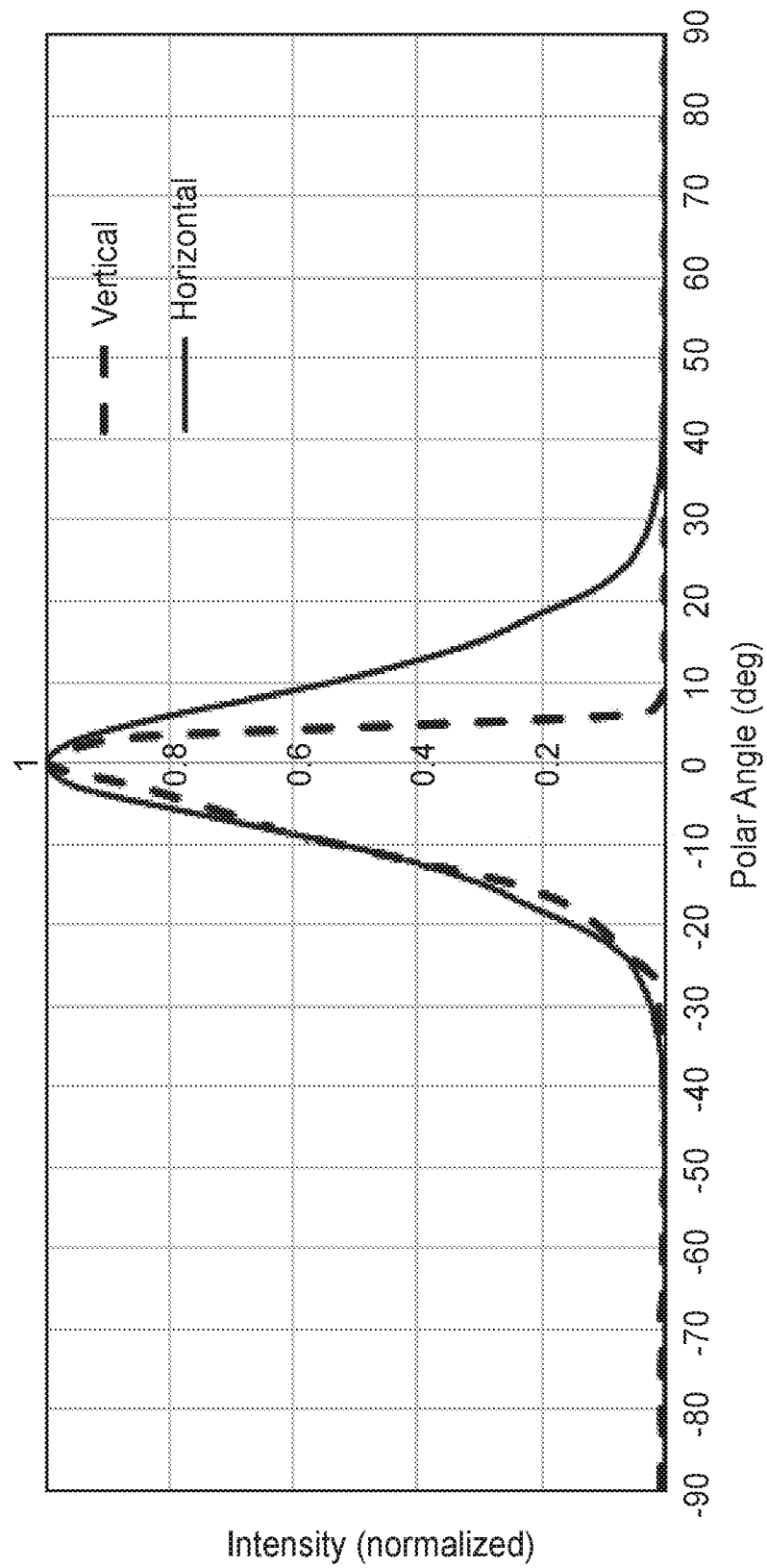
FIG. 9 is a polar angle intensity graph for Example 4.

The modeled circular light guide of Example 3 was trimmed to form a different model of a rectangular light guide of dimensions 10 mm by 12 mm with a thickness of 0.6 mm. The result is shown in FIG. 8. It was again assumed that the light guide with prisms had a refractive index of 1.49. Illumination of the light guide was modeled as a Lambertian LED (of dimensions 2 mm by 0.5 mm) that was attached to the left side of the light guide near the center of the circular arcs. Optical performance of the light guide was computed. Full width at half maximum (FWHM) was +/−10.6 degrees for the horizontal and +10.6/−4.4 degrees in the vertical direction. Normalized output intensity in horizontal and vertical were computed and are shown in FIG. 9.

Thus, embodiments of COLLIMATING LIGHT GUIDE are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A light guide comprising:
   a light input surface;
   a first major surface orthogonal to the light input surface;
   a second major surface opposing the first major surface;
   a plurality of discrete light extraction features disposed on the second major surface; and
   a plurality of closely packed prisms disposed along the second major surface, the plurality of discrete light extraction features separate the plurality of closely packed prisms from the second major surface, each of the closely packed prisms comprises a first prism surface closer to the light input surface than a second prism surface and the first prism surface forms a first angle with the second major surface, the first angle is in a range from 80 to 100 degrees or in a range from 85 to 95 degrees or in a range from 87 to 93 degrees; wherein the plurality of closely packed prisms forms at least a portion of a circle having an inner radius and an outer radius and the light input surface is located at the inner radius and the plurality of closely packed prisms are concentric with the inner radius and wherein a first arc portion of the light guide directs light in a first direction and a second arc portion of the light guide directs light in a second direction that is different than the first direction.

2. The light guide according to claim 1, wherein the material comprising the second major surface has a light guide refractive index, and the plurality of light extraction features have an extraction feature refractive index, and the light guide refractive index and the extraction feature refractive index are within 0.05 or within 0.02 or within 0.01 of each other.

3. The light guide according to claim 1, wherein the light input surface coincides with the plurality of closely packed prisms and Lambertian light enters the light input surface, and the light guide does not include a collimating region between the light input surface and the first major surface or the second major surface.

4. The light guide according to claim 1, wherein the first major surface is parallel with the second major surface.

5. The light guide according to claim 1, wherein the area density of the discrete light extraction features increases as a distance away from the light input surface increases.

6. The light guide according to claim 1, further comprising a light emitting diode transmitting Lambertian light into the light input surface.

7. The light guide according to claim 1, wherein the first major surface comprises light extraction features and a second plurality of closely packed prisms is disposed along the first major surface and directs light out of the second major surface.

8. The light guide according to claim 1, wherein the plurality of closely packed prisms forms a circle having an inner radius and an outer radius and the light input surface is located at the inner radius and the plurality of closely packed prisms are concentric with the inner radius.

9. The light guide according to claim 1, wherein light emitted from the light guide has a full width half max of less than 40 degrees or less than 30 degrees or less than 20 degrees.

10. The light guide according to claim 1, further comprising a light steering element receiving light emitted from the light guide, the light steering element modifying the emitted light from the light guide and the light steering element can optionally be spatially variant.

11. The light guide according to claim 10, further comprising a light source of the light guide and a sensor operably coupled to a controller that operates the light source of the light guide.

12. The light guide according to claim 1, wherein the light guide is tile-able to form a light guide array.

13. A light guide comprising:
    a light input surface;
    a first major surface orthogonal to the light input surface;
    a second major surface opposing the first major surface;
    a plurality of light extraction features disposed on the second major surface;
    a plurality of closely packed prisms disposed along the second major surface where the plurality of light extraction features separate the plurality of closely packed prisms from the second major surface, each of the closely packed prisms comprises a first prism surface closer to the light input surface than a second prism surface and the first prism surface forms a first angle with the second major surface, the first angle is in a range from 80 to 100 degrees or in a range from 85 to 95 degrees or in a range from 87 to 93 degrees;
    the light input surface forming an inner radius of at least a portion of a circle and the plurality of closely packed prisms are concentric with the inner radius; wherein a first arc portion of the light guide directs light in a first direction and a second arc portion of the light guide directs light in second direction that is different than the first direction.

14. The light guide according to claim 13, wherein the plurality of closely packed prisms form a 90 degree arc or a 180 degree arc or a 270 arc or a 360 degree annular shape.

15. The light guide according to claim 13, wherein the material comprising the second major surface has a light guide refractive index and the plurality of light extraction features have a extraction feature refractive index and the light guide refractive index and extraction feature refractive index are within 0.05 or within 0.02 or within 0.01 of each other.

16. The light guide according to claim 13, wherein the light input surface coincides with the plurality of closely packed prisms and Lambertian light enters the light input surface, and the light guide does not include a collimating region between the light input surface and the first major surface or the second major surface.

17. The light guide according to claim 13, further comprising a light emitting diode transmitting Lambertian light into the light input surface.

18. The light guide according to claim 13, wherein the first major surface comprises light extraction features and a second plurality of closely packed prisms are disposed along the first major surface and directs light out of the second major surface.

19. The light guide according to claim 13, wherein light emitted from the light guide has a full width half max of less than 40 degrees or less than 30 degrees or less than 20 degrees.

20. The light guide according to claim 13, further comprising a light steering element receiving light emitted from the light guide, the light steering element modifying the emitted from the light guide and the light steering element can optionally be spatially variant.

21. The light guide according to claim 20, further comprising a light source of the light guide and a sensor operably coupled to a controller that operates the light source of the light guide.

22. The light guide according to claim 13, wherein the light guide is tile-able to form a light guide array.

23. The light guide according to claim 1 wherein the plurality of discrete light extraction features reflects or redirects at least 60% or at least 70% or at least 80% or at least 90% or at least 95% or at least 99% of light incident on the plurality of discrete light extraction features out of the first major surface.

24. The light guide according to claim 1 wherein the light guide does not include a back reflector element proximate to the plurality of discrete light extraction features.

25. The light guide according to claim 13 wherein the plurality of discrete light extraction features reflects or redirects at least 60% or at least 70% or at least 80% or at least 90% or at least 95% or at least 99% of light incident on the plurality of discrete light extraction features out of the first major surface.

26. The light guide according to claim 13 wherein the light guide does not include a back reflector element proximate to the plurality of discrete light extraction features.

* * * * *